(12) United States Patent
Taki et al.

(10) Patent No.: US 11,768,344 B2
(45) Date of Patent: Sep. 26, 2023

(54) CABLE WIRING METHOD

(71) Applicant: FUJIKURA LTD., Tokyo (JP)

(72) Inventors: Go Taki, Sakura-shi (JP); Akira Namazue, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/764,779

(22) PCT Filed: Jul. 6, 2020

(86) PCT No.: PCT/JP2020/026378
§ 371 (c)(1),
(2) Date: Mar. 29, 2022

(87) PCT Pub. No.: WO2021/070435
PCT Pub. Date: Apr. 15, 2021

(65) Prior Publication Data
US 2022/0342173 A1    Oct. 27, 2022

(30) Foreign Application Priority Data

Oct. 8, 2019 (JP) .................................. 2019-185500

(51) Int. Cl.
*G02B 6/48* (2006.01)
*G02B 6/04* (2006.01)
*G02B 6/44* (2006.01)

(52) U.S. Cl.
CPC ............... *G02B 6/483* (2013.01); *G02B 6/48* (2013.01); *G02B 6/04* (2013.01); *G02B 6/4471* (2013.01)

(58) Field of Classification Search
CPC .......... G02B 6/04; G02B 6/4471; G02B 6/48; G02B 6/483
See application file for complete search history.

(56) References Cited

U.S. PATENT DOCUMENTS 9,748,021 B2 * 8/2017 Warren .................... H02G 7/00
2017/0146764 A1   5/2017 Warren et al.

FOREIGN PATENT DOCUMENTS

| AU | 2010100772 A4 | 8/2010 |
|----|---------------|--------|
| JP | S57-197939 A  | 12/1982 |
| JP | H08-43698 A   | 2/1996 |
| JP | 2000-102126 A | 4/2000 |

(Continued)

OTHER PUBLICATIONS

International Search Report issued in corresponding International Application No. PCT/JP2020/026378, dated Sep. 8, 2020 (6 pages).

(Continued)

*Primary Examiner* — Ryan A Lepisto
(74) *Attorney, Agent, or Firm* — Osha Bergman Watanabe & Burton LLP

(57) ABSTRACT

An optical cable wiring method, includes: installing a bundle of optical cables from a utility pole as a starting point of a first wiring path to a branch point on the first wiring path; dividing, at the branch point, the bundle of optical cables into a first group and a second group; installing one of the optical cables in the first group along the first wiring path ahead of the branch point; and installing one of the optical cables in the second group along a second wiring path branching from the first wiring path.

13 Claims, 8 Drawing Sheets

(56) References Cited

FOREIGN PATENT DOCUMENTS

| | | | | |
|---|---|---|---|---|
| JP | 2005156663 | A | * | 6/2005 |
| JP | 2005-184935 | A | | 7/2005 |
| JP | 2006020439 | A | * | 1/2006 |
| JP | 2007-304549 | A | | 11/2007 |
| JP | 2008-129170 | A | | 6/2008 |
| JP | 2008129170 | A | * | 6/2008 |
| JP | 2011-059607 | A | | 3/2011 |
| JP | 2011211871 | A | * | 10/2011 |
| JP | 2011-232694 | A | | 11/2011 |
| JP | 2012-096827 | A | | 5/2012 |
| JP | 2014-121178 | A | | 6/2014 |
| TW | 200510814 | A | | 3/2005 |
| TW | 200900773 | A | | 1/2009 |
| TW | 200907449 | A | | 2/2009 |
| TW | M370090 | U | | 12/2009 |
| WO | 2016/094595 | A1 | | 6/2016 |

OTHER PUBLICATIONS

Office Action issued in corresponding Taiwanese Patent Application No. 11020823750, dated Aug. 25, 2021 (6 pages).

* cited by examiner

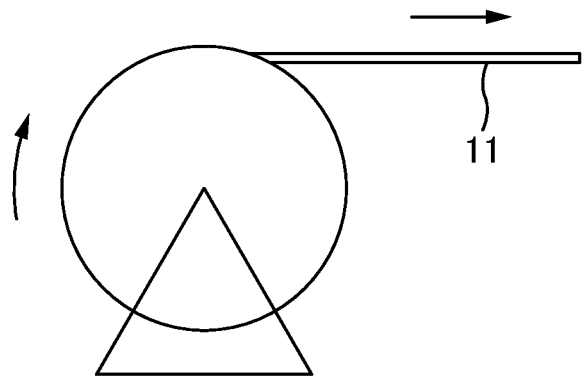
FIG. 7A (FIRST REFERENTIAL EXAMPLE)
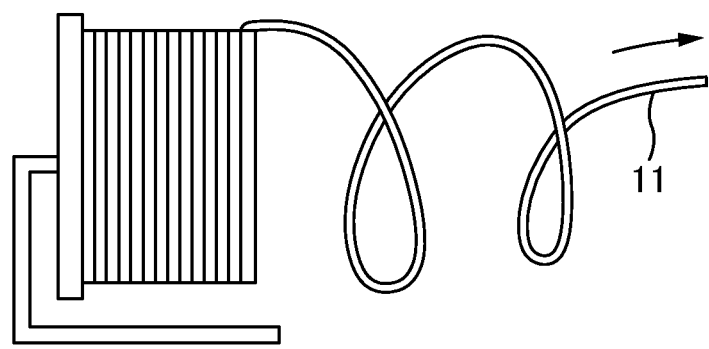
FIG. 7B (SECOND REFERENTIAL EXAMPLE)

CABLE WIRING METHOD

TECHNICAL FIELD

The present disclosure relates to a cable wiring method.

BACKGROUND

When an optical cable is laid from a feeder point (a starting point) to a drop point, the optical cable may be installed between utility poles on a wiring path. When a non-self-supporting optical cable without a support wire is installed, a bucket truck is used to install the optical cable via a cable hanger, on a suspension wire installed between utility poles.

PATENT LITERATURE

Patent Literature 1: JP 2007-304549A

A branch cable branching from an optical cable may be laid at a branch point of a wiring path. In this case, a branching operation of attaching a closure to the optical cable, attaching a branch cable to the optical cable, and the like is needed at the branch point. However, an overhead branching operation requires an enormous cost, and thus the overhead branching operation may be reduced.

Note that Patent Literature 1 describes that a branch cable branches in advance at a position being a branch point in a factory. However, in this case, a distance from a feeder point to the branch point needs to be known in advance, and a usage place of an optical cable is limited (also, an operation of laying an optical cable provided with a branch cable in advance is difficult).

One or more embodiments can easily branch and wire an optical cable.

SUMMARY

According to one or more embodiments, an optical cable wiring method comprises: an optical cable wiring method, including: preparing a plurality of cable supply sources each configured to supply optical cables; forming a group of cables by drawing out the optical cables from the plurality of cable supply sources and bringing together (i.e., bundling together) a plurality of the optical cables; installing the plurality of (i.e., a bundle of) optical cables from a utility pole being a starting point of a first wiring path to a branch point on the first wiring path by inserting the group of cables into a cable hanger laid on a suspension wire installed between utility poles; dividing, at the branch point, the plurality of optical cables constituting the group of cables into a first group and a second group; installing the optical cable belonging to the first group along the first wiring path located ahead of the branch point; and installing the optical cable belonging to the second group along a second wiring path branching from the first wiring path.

Other features of one or more embodiments are made clear by the following description and the drawings.

With one or more embodiments, it is possible to easily branch and wire an optical cable.

BRIEF DESCRIPTION OF THE DRAWINGS

FIG. 7A is an explanatory diagram of a cable supply source according to a first referential example.

FIG. 7B is an explanatory diagram of a cable supply source according to a second referential example.

DETAILED DESCRIPTION

At least the following matters are made clear from the following description and the drawings.

An optical cable wiring method will become clear, comprising: preparing a plurality of cable supply sources each configured to supply optical cables; forming a group of cables by drawing out the optical cables from the plurality of cable supply sources and bringing together a plurality of the optical cables; installing the plurality of optical cables from a utility pole being a starting point of a first wiring path to a branch point on the first wiring path by inserting the group of cables into a cable hanger laid on a suspension wire installed between utility poles; dividing, at the branch point, the plurality of optical cables constituting the group of cables into a first group and a second group; installing the optical cable belonging to the first group along the first wiring path located ahead of the branch point; and installing the optical cable belonging to the second group along a second wiring path branching from the first wiring path. With such an optical cable wiring method, it is possible to easily branch and wire the optical cable.

An optical connector may be attached to an end portion of the optical cable drawn out from the cable supply source. In this way, a connecting operation of the optical cable is facilitated.

The optical connector attached to the end portion of the optical cable belonging to the second group may be connected to a closure located on the second wiring path, to install the optical cable between utility poles from the starting point to the closure. In this way, an operation of connecting the optical cable to the closure is facilitated.

The group of cables may be inserted into the cable hanger by displacing positions, in a longitudinal direction, of the plurality of optical connectors for the plurality of optical cables constituting the group of cables. In this way, the group of cables is more easily inserted into the cable hanger.

After installing the plurality of optical cables, further inserting another optical cable into the cable hanger into which the group of cables may be inserted. In this way, an additional optical cable can be wired.

Embodiments

First, a comparative example will be described, and subsequently, an optical cable wiring method according to one or more embodiments will be described.

Comparative Example

FIGS. 8A to 8D are explanatory diagrams of an optical cable wiring method according to the comparative example.

Figure 8A:
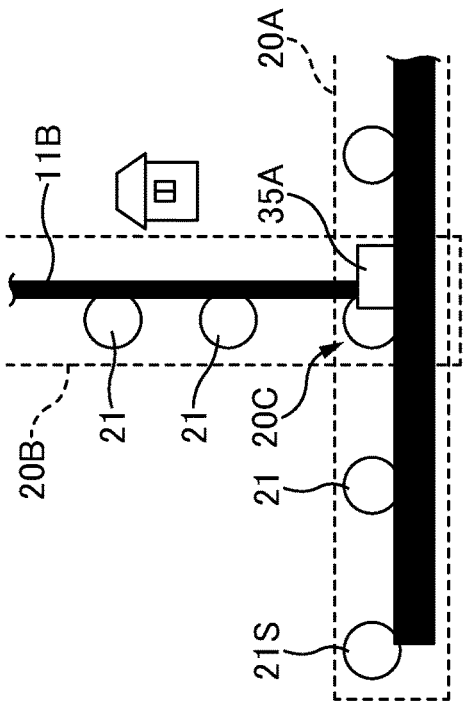
FIG. 8A is explanatory diagram of an optical cable wiring method according to a comparative example.

As illustrated in FIG. 8A, a first cable 11A is laid from a utility pole 21S being a starting point. The utility pole 21S being the starting point is, for example, a utility pole at a feeder point (a connecting place of an underground cable and an overhead cable (the first cable 11A)). If an optical cable is individually laid from the feeder point to a house of each user, laying the optical cable is inefficient. Thus, an area is divided into a plurality of areas, a branch cable (a second cable 11B) branches from the first cable 11A, and the second cable 11B is laid in each of the areas. Here, the first cable 11A is laid along a first wiring path 20A, and the second cable 11B branching from the first cable 11A is laid along a second wiring path 20B. Here, a drop point is located on the second wiring path 20B.

Figure 8C:
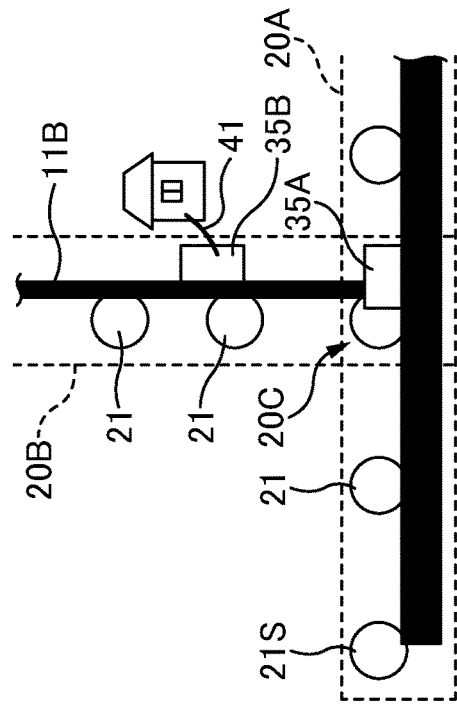
FIG. 8C is explanatory diagram of an optical cable wiring method according to a comparative example.
Figure 8B:
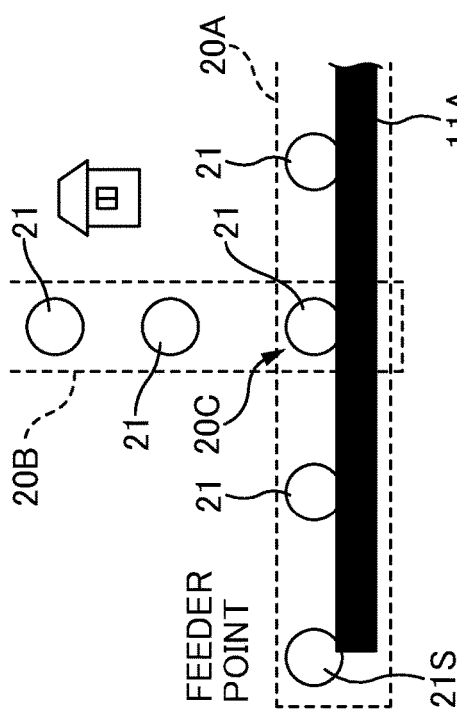
FIG. 8B is explanatory diagram of an optical cable wiring method according to a comparative example.

As illustrated in FIG. 8B, a closure 35A is set on the first cable 11A at a branch point 20C, and as illustrated in FIG. 8C, the second cable 11B (the branch cable) is installed from the branch point 20C. The closure 35A is a member that houses a connecting point of optical fibers and an extra length of the optical fibers. Here, the closure 35A houses a connecting point between an optical fiber of the first cable 11A and an optical fiber of the second cable 11B. The connecting point of the optical fiber is, for example, a fusion splicing connecting point by fusion splicing, a mechanical connecting point by mechanical splicing, and a connector connecting point by an optical connector (a field assembly optical connector).

In a case of the comparative example, a branching operation of attaching the closure 35A to a middle position of the first cable 11A, and branching the second cable 11B from the first cable 11A is needed at the branch point 20C. Examples of the branching operation of branching the second cable 11B from the first cable 11A include an operation of removing a sheath of the first cable 11A, cutting a part of the optical fiber inside the first cable 11A, connecting the cut optical fiber to the optical fiber of the second cable 11B, housing the connecting point in the closure 35A. In the comparative example, such a branching operation needs to be performed overhead, and thus the branching operation is costly. A coupling loss of the optical fiber is caused at the branch point 20C.

In the comparative example, the optical fiber cut at the branch point 20C is left inside the first cable 11A laid ahead of the branch point 20C. In other words, the wiring path located ahead of the branch point 20C is in a state where the first cable 11A including an unused optical fiber is installed.

Figure 8D:
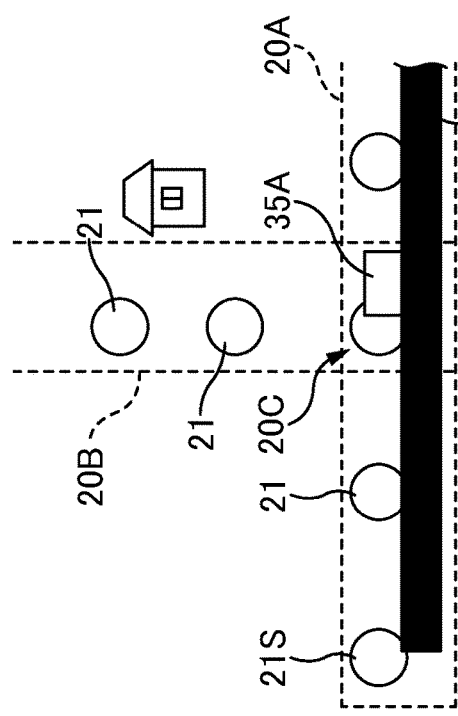
FIG. 8D is explanatory diagram of an optical cable wiring method according to a comparative example.

Note that, as illustrated in FIG. 8D, another closure 35B (a drop closure) is attached to a middle position (the drop point) of the second cable 11B, and a lead-in cable (for example, a drop cable) is laid from the closure 35B to a house of a user. As illustrated in FIG. 8D, also in the middle position of the second cable 11B (the attachment position of the closure 35B), an operator requires an operation of taking out a part of the optical fiber from the inside of the second cable 11B, cutting the optical fiber being taken out, and connecting the cut optical fiber to the lead-in cable 41 (an operation of connecting an end portion of the cut optical fiber to the closure 35B). The cut optical fiber is left inside the second cable 11B laid ahead of the closure 35B.

{Optical Cable Wiring Method According to Present Embodiments}

FIGS. 1A to 1D are diagrams schematically illustrating the optical cable wiring method according to one or more embodiments. FIG. 2 is an explanatory diagram of an overhead structure 100 near a utility pole 21S being a feeder point.

Figure 1A:
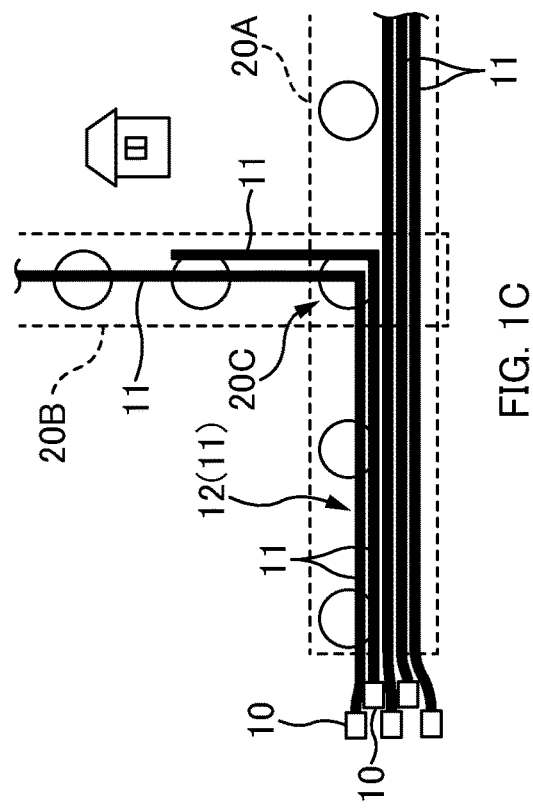
FIG. 1A is diagram schematically illustrating an optical cable wiring method according to one or more embodiments.
Figure 2:
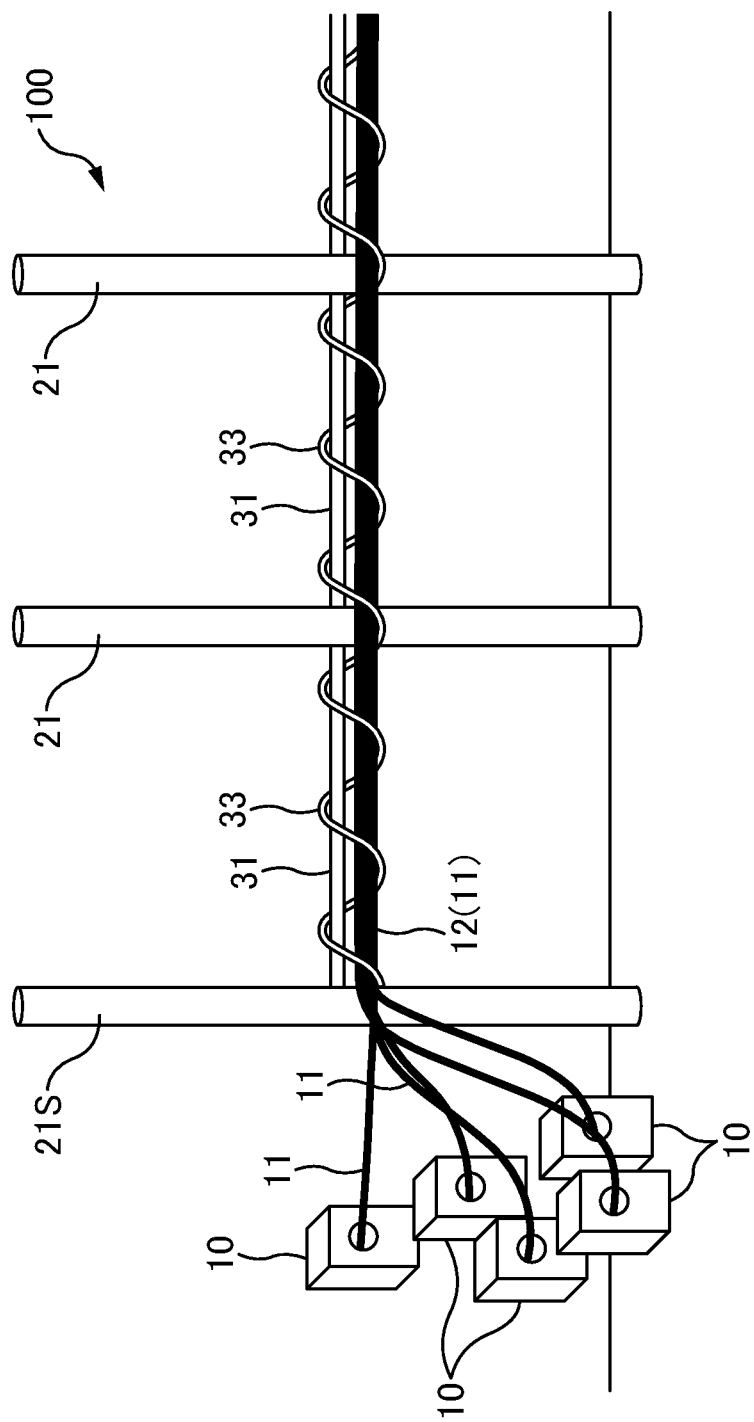
FIG. 2 is an explanatory diagram of an overhead structure near a utility pole being a feeder point.

As illustrated in FIG. 1A, a plurality of utility poles 21 are arranged from the feeder point to a house of a user. The plurality of utility poles 21 are arranged on a first wiring path 20A with the feeder point as a starting point. A branch point 20C is located on the first wiring path 20A, and a second wiring path 20B branches from the first wiring path 20A at the branch point 20C. The plurality of utility poles 21 are also arranged on the second wiring path 20B. The house of the user is located in an area outside the first wiring path 20A, and is located near the utility pole 21 on the second wiring path 20B. A drop point is located on the second wiring path 20B. Note that the drop point may be located on a wiring path further branching from the second wiring path 20B.

Each of the utility poles 21 is a pole for installing an electric wire and an optical cable. The utility pole 21 is, for example, a cement pole and a steel pipe pole. The plurality of utility poles 21 are arranged on the wiring path (refer to FIG. 1A).

In one or more embodiments, as illustrated in FIGS. 1A and 2, an operator prepares a plurality of cable supply sources 10 near the utility pole 21S being the feeder point. Each of the cable supply sources 10 is a supply source that supplies an optical cable 11. In other words, the cable supply source 10 is a housing (a package) that houses the optical cable 11. Note that the cable supply source 10 according to one or more embodiments is, for example, a housing that houses the optical cable 11 by reelex packaging (REELEX: registered trademark).

Figure 3A:
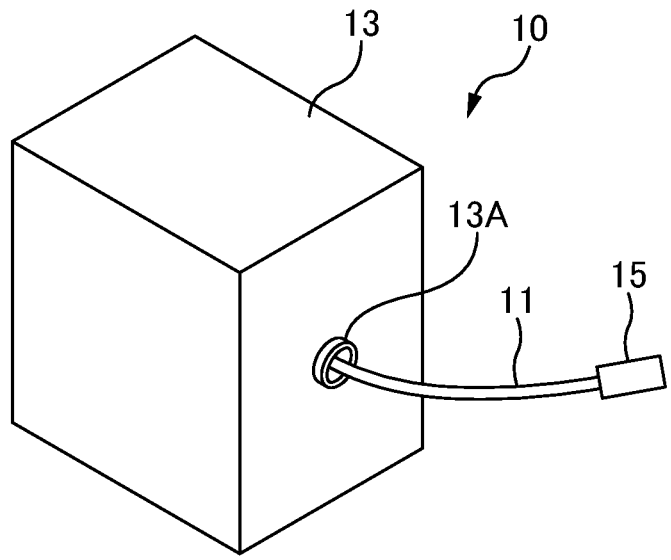
FIG. 3A is explanatory diagram of a cable supply source according to one or more embodiments.
Figure 3B:
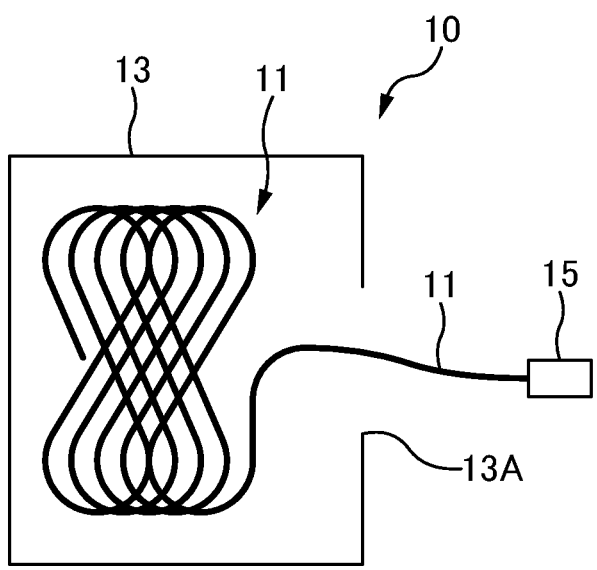
FIG. 3B is explanatory diagram of a cable supply source according to one or more embodiments.

FIGS. 3A and 3B are explanatory diagrams of the cable supply source 10 according to one or more embodiments. FIG. 3A is a perspective view of the cable supply source 10 according to one or more embodiments. FIG. 3B is an explanatory diagram of a housing state of the optical cable 11 according to one or more embodiments.

In the one or more embodiments, an optical connector 15 is attached to an end portion of the optical cable 11 supplied from the cable supply source 10. The cable supply source 10 according to one or more embodiments includes the optical cable 11, a housing box 13, and the optical connector 15.

Figure 4:
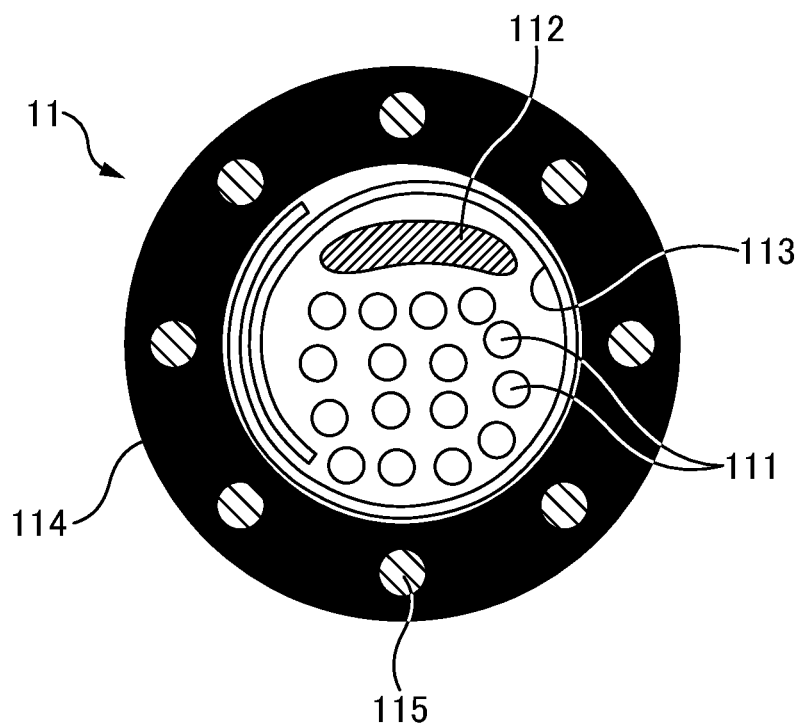
FIG. 4 is a cross-sectional view of an optical cable.

FIG. 4 is a cross-sectional view of the optical cable 11. The optical cable 11 is a cable that houses an optical fiber 111 inside a sheath 114. The optical cable 11 according to one or more embodiments is a non-self-supporting optical cable without a support wire. The optical cable 11 includes a plurality of the optical fibers 111, a water absorption member 112, a wrapping tape 113, the sheath 114, and a tensile strength member 115. Note that a structure of the optical cable 11 is not limited to the structure.

The housing box 13 is a box (a package box) that houses the optical cable 11 (refer to FIGS. 3A and 3B). As illustrated in FIG. 3A, a drawing-out opening 13A is located in a side surface of the housing box 13, and the optical cable 11 can be drawn out from the drawing-out opening 13A. As illustrated in FIG. 3B, the optical cable is housed inside the housing box 13 in a state where the optical cable 11 is wound in a figure-eight shape. In this way, the optical cable 11 can be drawn out from the drawing-out opening 13A without causing a twist of the optical cable 11.

FIG. 7A is an explanatory diagram of a cable supply source 10 according to a first referential example. In the first referential example, the optical cable 11 is reeled onto a reel. In the first referential example, the optical cable 11 is unreeled while rotating the reel. Thus, in the first referential example, a large force is required when the optical cable 11 is unreeled from the reel. In contrast, with the cable supply source 10 according to one or more embodiments, the optical cable 11 in the state of being wound in the figure-eight shape in advance is just drawn out (unreeled), and thus a reel does not need to be rotated, and a large force is not required when the optical cable 11 is drawn out. In the first referential example, when stopping the unreeling of the optical cable 11 from the reel, the reel continues to rotate by inertia and the optical cable 11 loosens. Thus, rotation of the reel needs to be adjusted, and an operator for adjusting the rotation of the reel needs to be arranged for the cable supply source 10. In contrast, the cable supply source 10 according to one or more embodiments does not include a member like a reel that continues to rotate by the inertia, and thus the optical cable 11 does not loosen when the drawing out of the optical cable 11 is stopped, and the number of operators arranged for the cable supply source 10 can be suppressed. When the plurality of cable supply sources 10 according to the first referential example are prepared, and the optical cable 11 is collectively unreeled from each of the plurality of cable supply sources 10, an extremely large force is required. In contrast, with the cable supply source 10 according to one or more embodiments, when the optical cable 11 is collectively drawn out from each of the plurality of cable supply sources 10 (described below), a large force is not required, which is particularly effective. In the first referential example, when collectively stopping the unreeling of the plurality of optical cables 11, the rotation of reels of respective cable supply sources 10 needs to be adjusted at the same time, and thus an operator needs to be arranged for each of the cable supply sources 10, and many operators are required. In contrast, when the plurality of cable supply sources 10 according to one or more embodiments are used, an operator does not need to be arranged for each of the cable supply sources 10, and thus the number of operators can be greatly reduced.

FIG. 7B is an explanatory diagram of a cable supply source 10 according to a second referential example. In the second referential example, the optical cable 11 is wound in a coil shape, and the optical cable 11 is drawn out in a direction along a center axis of the coil (here, a right direction in the diagram). In the second referential example, a reel does not need to be rotated as in the first referential example, and thus a large force is not required when the optical cable 11 is drawn out. However, in the second referential example, when the optical cable 11 is drawn out, the optical cable 11 is twisted. In contrast, with the cable supply source 10 according to one or more embodiments, the optical cable 11 in the state of being wound in the figure-eight shape in advance is drawn out, and thus the optical cable 11 is not to be twisted.

The optical connector 15 is a member used for connection of the optical cable 11. The optical connector according to one or more embodiments is used for connecting the optical cable 11 to a closure 35 (a drop closure; refer to FIG. 1D). Note that the optical connector 15 may be connected to a member other than the closure 35 (an end point of the wiring path may not be the closure 35). The optical connector 15 according to one or more embodiments is, for example, a waterproof connector. Note that the optical connector 15 may not have a waterproof function. The optical connector 15 may not be attached to the end portion of the optical cable 11. Note that, when the optical connector 15 is attached to the end portion of the optical cable 11, as described below, an operation of connecting the optical cable 11 to the closure 35 is facilitated. Note that, when an optical cable (the first cable 11A and the second cable 11B in FIGS. 8A to 8D) in which intermediate branching is performed as in the comparative example is laid, the optical fiber located ahead of a branch point is not used, and thus laying the optical cable in a state where an optical connector is attached to an end portion is not performed.

After the plurality of cable supply sources 10 are prepared, an operator forms a group of cables 12 (a multi-core cable) by drawing out the optical cable 11 from each of the plurality of cable supply sources 10, and bringing together the plurality of optical cables 11. Then, the operator installs the plurality of the optical cables 11 by installing the group of cables 12.

FIG. 2 illustrates a state where the overhead structure 100 is formed by installing the group of cables 12. The overhead structure 100 is a structure that supports the overhead optical cables 11. The overhead structure 100 according to one or more embodiments includes the utility poles 21, a suspension wire 31, a cable hanger 33, and the group of cables 12.

The suspension wire 31 is a wire for suspending the optical cables 11, and is installed between the utility poles 21. The suspension wire 31 has tension of non-self-supporting optical cables 11 without a support wire.

The cable hanger 33 is a member for hanging the optical cables 11 on the suspension wire 31. The cable hanger 33 is sometimes referred to as a bundling member. The cable hanger 33 is laid on the suspension wire 31 installed between the utility poles 21. When the non-self-supporting optical cables 11 without a support wire is installed, the optical cables 11 (and the group of cables 12) are installed, via the cable hanger 33, on the suspension wire 31 installed between the utility poles 21. For example, the cable hanger 33 may be a long-length hanger such as a spiral hanger and a cosine curve hanger, and may be a plurality of U-shaped hangers arranged along the suspension wire 31.

Figure 5:
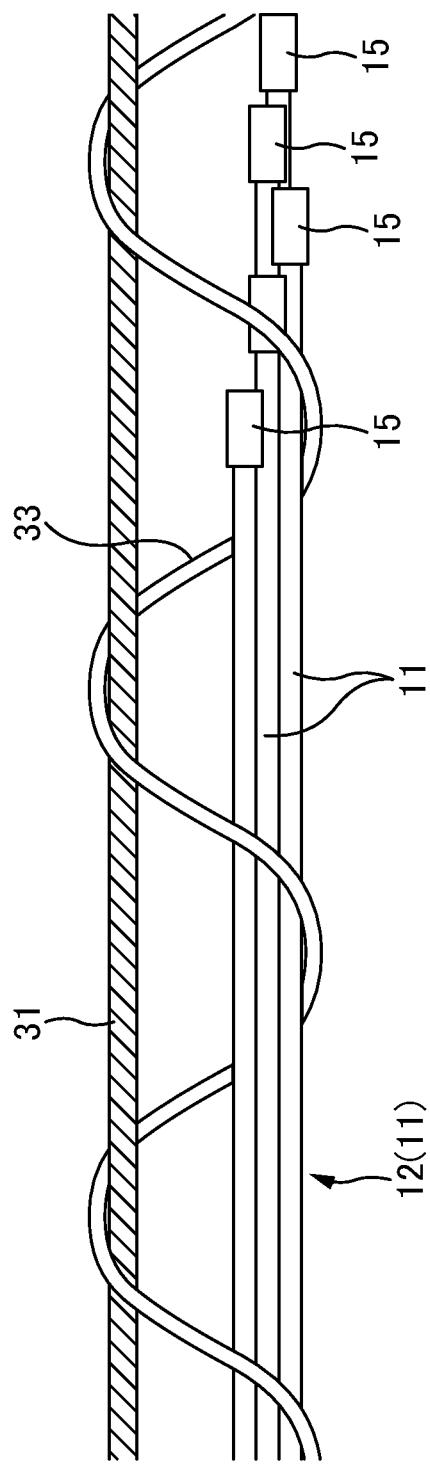
FIG. 5 is an explanatory diagram of a state where a group of cables is inserted into a cable hanger.

FIG. 5 is an explanatory diagram of a state where the group of cables 12 is inserted into the cable hanger 33.

The optical connector 15 according to the one or more embodiments has a cross-sectional area greater than that of the optical cable 11. Thus, if the group of cables 12 is formed by aligning positions of a plurality of the optical connectors 15, a cross-sectional area of an end portion of the group of cables 12 (the plurality of optical connectors 15) increases, and it is more difficult to insert the group of cables 12 into the cable hanger 33. In contrast, in one or more embodiments, an operator forms the group of cables 12 by displacing the positions of the plurality of optical connectors 15 in a longitudinal direction relative to each other to thereby suppress a size of the cross-sectional area of the end portion of the group of cables 12. Thus, in one or more embodiments, the group of cables 12 can be easily inserted into the cable hanger 33. Note that, when inserting the group of cables 12 into the cable hanger 33, the operator can use a cable insertion tool (for example, a cable insertion rod, or a cable insertion tool described in JP 2018-46739A).

Figure 1B:
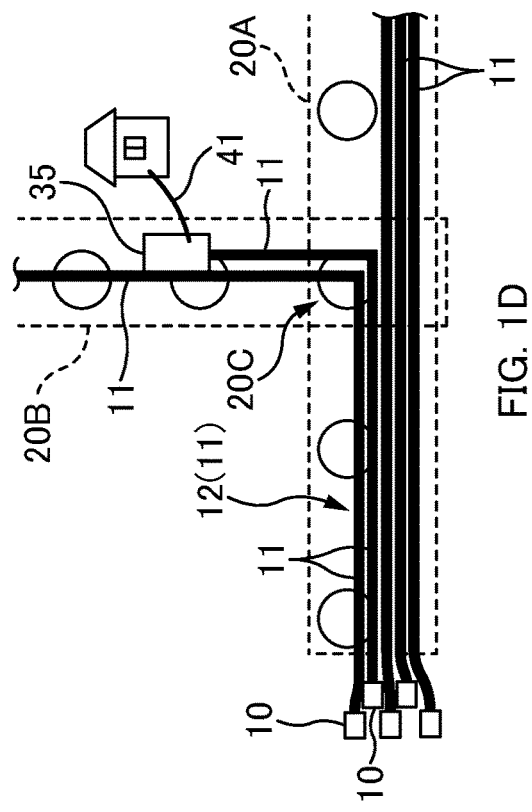
FIG. 1B is diagram schematically illustrating an optical cable wiring method according to one or more embodiments.

By inserting the group of cables 12 into the cable hanger 33 as illustrated in FIGS. 2 and 5, the operator installs the plurality of optical cables 11 on the first wiring path 20A from the utility pole 21S being the feeder point to the utility pole 21 being the branch point 20C as illustrated in FIG. 1B. In one or more embodiments, by inserting the group of cables into the cable hanger 33, the plurality of optical cables 11 (the multi-core cable) can be collectively installed. Thus, an installing operation of the plurality of optical cables 11 is facilitated.

When inserting the group of cables 12 into the cable hanger 33, the optical cables 11 are drawn out from the plurality of cable supply sources 10 at the same time. In one or more embodiments, a small force for drawing out each optical cable 11 from the corresponding cable supply source 10 is enough (refer to FIGS. 3A and 3B), and thus a force for collectively drawing out the optical cables 11 from the plurality of cable supply sources 10 is reduced. For this reason, in one or more embodiments, the optical cables 11 can be easily collectively drawn out from the plurality of cable supply sources 10, and thus an operation of inserting the group of cables 12 into the cable hanger 33 is facilitated.

The operator divides the plurality of optical cables 11 constituting the group of cables 12 into groups at the branch point 20C. Here, the operator divides the plurality of optical cables 11 constituting the group of cables 12 into two groups of a first group and a second group. Note that the plurality of optical cables 11 may be divided into three or more groups (note that, when the plurality of optical cables 11 are divided into three or more groups, at least the first group and the second group are also present). The optical cable 11 belonging to the first group may be one cable, or may include a plurality of cables. The optical cable 11 belonging to the second group may be one cable, or may include a plurality of cables.

Figure 1C:
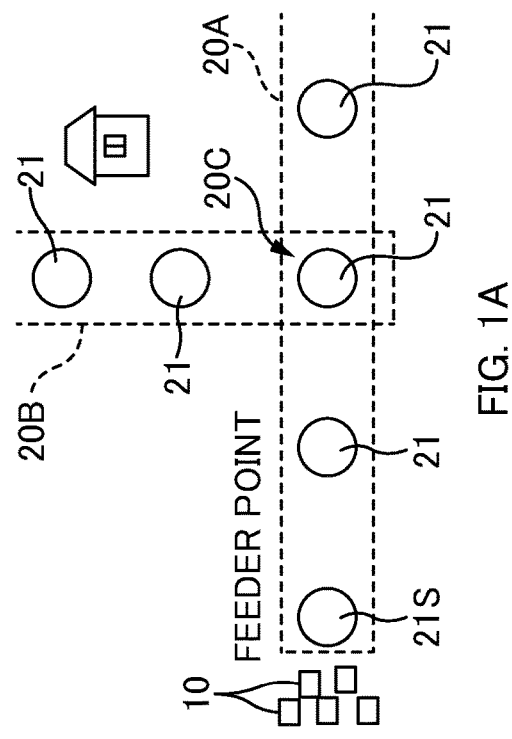
FIG. 1C is diagram schematically illustrating an optical cable wiring method according to one or more embodiments.

As illustrated in FIG. 1C, the operator installs the optical cable 11 belonging to the first group (the optical cable 11 that is a part of the group of cables 12) along the first wiring path 20A located further ahead of the branch point 20C. The operator installs the optical cable 11 belonging to the second group (the optical cable 11 that is a part of the group of cables 12) along the second wiring path 20B. Note that, also in respect to the optical cable 11 belonging to each of the groups, the operator installs the optical cable 11 by inserting the optical cable 11 into the cable hanger 33.

As described above, in one or more embodiments, by forming the group of cables 12 by bringing together the plurality of optical cables 11, and inserting the group of cables 12 into the cable hanger 33, the plurality of optical cables 11 are installed on the first wiring path 20A from the utility pole 21 at the feeder point to the utility pole 21 being the branch point 20C. Then, in one or more embodiments, the plurality of optical cables 11 constituting the group of cables 12 are divided into groups at the branch point 20C, the optical cable 11 belonging to the first group is installed along the first wiring path 20A located ahead of the branch point 20C, and the optical cable 11 belonging to the second group is installed along the second wiring path 20B. In this way, in one or more embodiments, the branching operation of attaching the closure 35A (refer to FIG. 8B) at the branch point 20C, branching the second cable 11B from the first cable 11A, and the like as in the comparative example is not needed. In one or more embodiments, the plurality of optical cables constituting the group of cables 12 are just divided into groups at the branch point 20C, and thus an overhead operation is easy and cost can be suppressed. In one or more embodiments, the coupling loss of the optical fiber 111 at the branch point 20C can be suppressed.

As illustrated in FIG. 1C, in one or more embodiments, the number of the optical cables 11 is reduced on the first wiring path 20A located ahead of the branch point 20C (in contrast, in the comparative example, as illustrated in FIG. 8C, the first cable 11A including an unused optical fiber is installed). Thus, in one or more embodiments, a load applied to the cable hanger 33 on the first wiring path 20A located ahead of the branch point 20C can be further reduced than that in the comparative example.

In one or more embodiments, an operation of installing the optical cable 11 belonging to the first group along the first wiring path 20A further located ahead of the branch point 20C (a first installing operation), and an operation of installing the optical cable 11 belonging to the second group along the second wiring path 20B (a second installing operation) are performed at the same time. In this way, an operation of unreeling the optical cable 11 belonging to the first group (a first unreeling operation), and an operation of unreeling the optical cable 11 belonging to the second group (a second unreeling operation) are performed at the same time, and thus the unreeling operations of the plurality of optical cables 11 (the group of cables 12) from the feeder point to the branch point 20C can be performed together. As a result, the first unreeling operation and the second unreeling operation are facilitated, and the first installing operation and the second installing operation are facilitated.

Note that the first installing operation and the second installing operation may be performed at different timings. In this case, the operation of unreeling the optical cable belonging to the first group (the first unreeling operation), and the operation of unreeling the optical cable 11 belonging to the second group (the second unreeling operation) are performed at different timings, and thus the moving amount of the optical cables 11 moved inside the cable hanger 33 from the feeder point to the branch point 20C (the unreeling amount of the optical cables 11 unreeled at the same time) is reduced than that when the first unreeling operation and the second unreeling operation are performed at the same time. As a result, a load applied to the cable hanger 33 from the feeder point to the branch point 20C can be reduced.

Figure 1D:
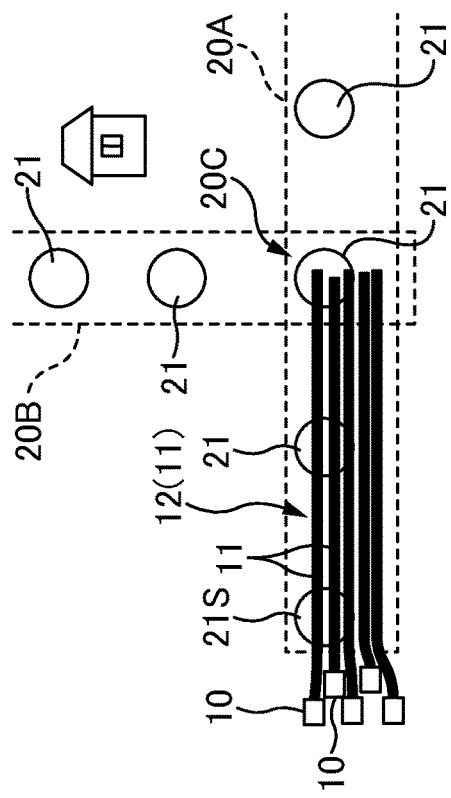
FIG. 1D is diagram schematically illustrating an optical cable wiring method according to one or more embodiments.

As illustrated in FIG. 1D, the operator sets the closure 35 near the house of the user on the second wiring path 20B. The closure 35 is the drop closure set at the drop point. Here, the closure 35 is set on the utility pole 21 near the house of the user, but an overhead closure may be set on the suspension wire 31 installed between the utility poles 21 on the second wiring path 20B.

An insertion hole (not illustrated) for inserting the optical connector 15 is formed in the closure 35. As illustrated in FIG. 1D, the operator connects the optical cable 11 to the closure 35 by inserting the optical connector 15 attached to the end portion of the optical cable 11 (the optical cable 11 belonging to the second group) into the insertion hole of the closure 35. By connecting the optical connector 15 at the end portion of the optical cable 11 (the optical cable 11 belonging to the second group) to the closure 35, an operation of installing the optical cable 11 from the feeder point to the closure 35 (the closure 35 on the second wiring path 20B) is completed. As compared to the case where the closure 35 is set in the middle position of the second cable 11B as in the comparative example illustrated in FIG. 8D, in one or more embodiments, a connecting operation of the optical cable 11 (the optical cable 11 belonging to the second group) and the closure 35 is facilitated.

As illustrated in FIG. 1D, the operator leads the optical fiber from the closure 35 to the house of the user via the lead-in cable 41 (for example, the drop cable). For example, by connecting the optical connector (for example, the field assembly optical connector) attached to one end of the drop cable to the closure 35, the operator wires the lead-in cable 41 between the closure 35 and the house of the user, and leads the optical fiber from the closure 35 to the house of the user.

As illustrated in FIG. 1D, in one or more embodiments, the number of the optical cables 11 (the optical cable 11 belonging to the second group) is reduced on the second wiring path 20B located ahead of the closure 35. Thus, in one or more embodiments, a load applied to the cable hanger on the second wiring path 20B located ahead of the closure 35 can be further reduced than that in the comparative example.

Note that, after wiring the optical cable 11 is finished, the operator performs, at the feeder point, a connecting operation of connecting the optical cable 11 (an overhead cable) on the cable supply source 10 side to an underground cable. In this way, installation of the optical cable 11 from the feeder point (the starting point) to the drop point (the end point) is completed.

Figure 6:
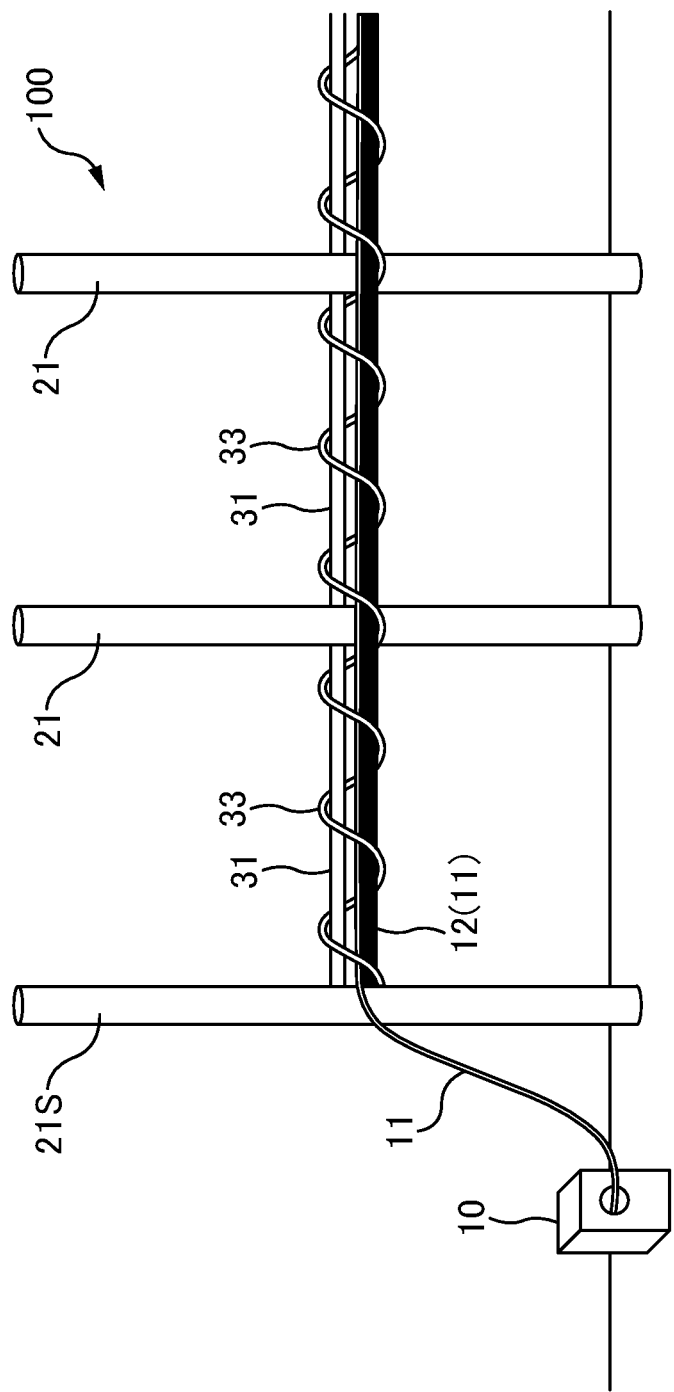
FIG. 6 is an explanatory diagram of a state where an additional optical cable is installed.

FIG. 6 is an explanatory diagram of a state where an additional optical cable 11 is installed.

After the optical cable 11 is installed, another optical cable 11 (an additional cable) may be further added and installed. In such a case, as illustrated in the diagram, the operator inserts the additional optical cable 11 into the cable hanger 33 into which the group of cables 12 has already been inserted.

In other words, the operator first prepares the cable supply source 10 near the utility pole 21S being the feeder point. As already described, the optical connector 15 (for example, a waterproof connector) may be attached to the end portion of the optical cable 11 drawn out from the cable supply source 10. In the housing box 13 of the cable supply source 10, the optical cable 11 may be housed in the state of being wound in the figure-eight shape, and the optical cable 11 is drawn out from the drawing-out opening 13A without causing a twist of the optical cable 11. Then, the operator draws out the optical cable 11 from the cable supply source 10, and inserts the additional optical cable 11 into the cable hanger 33 into which the group of cables 12 has already been inserted, by using the cable insertion tool (for example, a cable insertion rod, or the cable insertion tool described in JP 2018-46739A).

{Others}

The foregoing embodiments are for facilitating the understanding of the present disclosure, and are not to be construed as limiting the present disclosure. The present disclosure may be modified and/or improved without departing from the gist thereof, and it goes without saying that the present disclosure encompasses any equivalents thereof.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST

10: Cable supply source;
11: Optical cable;
11A: First cable;
11B: Second cable;
111: Optical fiber;
112: Water absorption member;
113: Wrapping tape;
114: Sheath;
115: Tensile strength member;
12: Group of cables;
13: Housing box;
13A: Drawing-out opening;
15: Optical connector;
20A: First wiring path;
20B: Second wiring path;
20C: Branch point;
21: Utility pole;
21S: Utility pole (starting point; feeder point);
31: Suspension wire;
33: Cable hanger;
35: Closure;
41: Lead-in cable;
100: Overhead structure.

The invention claimed is:

1. An optical cable wiring method, comprising:
drawing out optical cables from cable supply sources disposed at a starting point of a first wiring path;
bundling the drawn optical cables to form a bundle; and
while the cable supply sources are fixed at the starting point:
installing the bundle of the optical cables from the starting point to a branch point on the first wiring path;
dividing, at the branch point, the bundle of the optical cables into a first group and a second group;
installing one of the optical cables in the first group along the first wiring path ahead of the branch point; and
installing one of the optical cables in the second group along a second wiring path branching from the first wiring path.

2. The optical cable wiring method according to claim 1, wherein
each of the cable supply sources is a housing box, and
the optical cable wiring method further comprises:
housing, in the respective housing box, each of the optical cables wound in a figure-eight shape.

3. The optical cable wiring method according to claim 1, wherein
each of the cable supply sources is a housing box, and
the optical cable wiring method further comprises:
housing each of the optical cables in the respective housing box without a reel.

4. The optical cable wiring method according to claim 2, further comprising:
collectively drawing out each of the optical cables from the respective housing box; and
bundling the drawn optical cables to form the bundle.

5. The optical cable wiring method according to claim 1, further comprising:
attaching an optical connector to an end portion of one of the optical cables drawn out from one of the cable supply sources.

6. The optical cable wiring method according to claim 5, wherein
the starting point serve as a feeder point,
the optical cable wiring method further comprises:

installing one of the optical cables in the second group to a drop point along the second wiring path that branches off from the first wiring path; and attaching the optical connector to the end portion of one of the optical cables drawn out from one of the cable supply sources and installed from the feeder point to the drop point.

7. The optical cable wiring method according to claim 5, further comprising:

connecting the optical connector attached to the end portion of one of the optical cables in the second group to a closure located on the second wiring path; and installing one of the optical cables between utility poles from the starting point to the closure.

8. The optical cable wiring method according to claim 5, further comprising:

inserting the bundle of the optical cables into a cable hanger by displacing positions in a longitudinal direction of optical connectors for the bundle of the optical cables.

9. The optical cable wiring method according to claim 1, further comprising:

installing one of the optical cables in the first group while concurrently installing one of the optical cables in the second group.

10. The optical cable wiring method according to claim 1, further comprising:

installing one of the optical cables in the first group after or before installing one of the optical cables in the second group.

11. The optical cable wiring method according to claim 1, further comprising:

inserting another optical cable into a cable hanger, after installing the bundle of the optical cables into the hanger.

12. The optical cable wiring method according to claim 1, wherein the first wiring path ahead of the branch point includes a first utility pole, and the second wiring path includes second utility poles different from the first utility pole, and the optical cables in the second group are installed between the second utility poles.

13. The optical cable wiring method according to claim 1, further comprising:

leading a drop cable from a drop point to a house, wherein the cable supply sources do not include the drop point.

* * * * *